United States Patent
Macchi et al.

(10) Patent No.: US 11,242,477 B1
(45) Date of Patent: Feb. 8, 2022

(54) CURABLE POLYMERIC COMPOSITIONS HAVING IMPROVED OXYGEN BARRIER PROPERTIES

(71) Applicant: SAES GETTERS S.p.A., Lainate (IT)

(72) Inventors: Giorgio Macchi, Samarate (IT); Paolo Vacca, Milan (IT)

(73) Assignee: SAES GETTERS S.p.A., Lainate (IT)

( * ) Notice: Subject to any disclaimer, the term of this patent is extended or adjusted under 35 U.S.C. 154(b) by 0 days.

(21) Appl. No.: 17/293,567

(22) PCT Filed: Mar. 10, 2021

(86) PCT No.: PCT/EP2021/056111
§ 371 (c)(1),
(2) Date: May 13, 2021

(87) PCT Pub. No.: WO2021/180819
PCT Pub. Date: Sep. 16, 2021

(30) Foreign Application Priority Data

Mar. 13, 2020 (IT) .......................... 102020000005449

(51) Int. Cl.
*C09J 163/10* (2006.01)
*C09J 11/08* (2006.01)

(52) U.S. Cl.
CPC ............. *C09J 163/10* (2013.01); *C09J 11/08* (2013.01)

(58) Field of Classification Search
CPC ...................................... C09J 163/10
USPC .......................................................... 524/503
See application file for complete search history.

(56) References Cited

U.S. PATENT DOCUMENTS 5,141,984 A    8/1992   Orikasa

FOREIGN PATENT DOCUMENTS

| EP | 3180381 A1 | 6/2017 | |
| WO | WO-2017067865 A1 * | 4/2017 | ............ C09J 163/00 |
| WO | WO-2020012396 A1 | 1/2020 | |

OTHER PUBLICATIONS

International Search Report dated Apr. 6, 2021 in PCT/EP2021/056111, 7 pages.
Written Opinion dated Apr. 6, 2021 in PCT/EP2021/056111, 6 pages.

* cited by examiner

*Primary Examiner* — Deve V Hall
(74) *Attorney, Agent, or Firm* — Element IP, PLC

(57) ABSTRACT

Curable polymeric compositions with improved barrier property to oxygen suitable to be used on flexible substrates containing a bisphenol F epoxy resin, at least an epoxy acrylate component and at least a rubber modified bisphenol and further comprising EVOH capsules or beads dispersed therein. The polymeric compositions are applicable either by a melt or liquid coating technique and undergo curing upon exposure to heat, showing viscoelastic properties and suitable to provide a cured product having high durability.

15 Claims, No Drawings

CURABLE POLYMERIC COMPOSITIONS HAVING IMPROVED OXYGEN BARRIER PROPERTIES

The present invention relates to curable polymeric compositions, in particular thermally curable compositions, that are applicable by a melt or liquid coating technique and undergo curing upon exposure to heat, and more particularly to polymeric compositions with improved oxygen barrier performance in addition to optimal viscoelastic properties and suitable to provide a cured product having superior durability.

STATE OF THE ART

Adhesives have been widely used to bond various elements and materials due to their solvent-free nature and excellent environmental resistance. For example, several types of curable adhesive compositions have been proposed to be applied by melt or liquid coating and subsequent curing by irradiation or heat in order to exhibit high bond strength. Many adhesive technologies can be formulated into compositions suitable to be used as sealants, i.e. adopted to fill the gap between substrates and join them. For this reason, in the context of the present invention, the terms "adhesive" and "sealant" are used as synonyms, even though they represent different material classes: a sealant is mainly used to seal any space on or between one or more surfaces where it is applied in order to obtain a watertight area, while an adhesive is used to bind one surface to another and not to seal the space in between. Therefore, the present invention relates to both "adhesive" and "sealant" polymeric compositions i.e. it covers both "adhesive" and "sealant" material classes.

A large number of curable adhesive compositions is based on a ring-opening reaction of an epoxy resin, i.e. these curable adhesive compositions obtain a high bond strength through a ring-opening polymerization of an epoxy group. Up to now, the selection of the specific epoxy compound and the inclusion of a phenol-containing compound has been attempted to achieve improvements in bond strength or heat resistance after cure. Adherends are bonded together by these curable hot-melt or liquid adhesives and subsequently submitted to a curing treatment, by heat or radiation.

Generally, in case a photoreactive (i.e. containing a cationic photoinitiator) composition is selected, there is no need for the cationically curable adhesive to be irradiated continually until it is fully cured. In fact, once such an adhesive is irradiated, the curing reaction in which radiation-generated cationic active species participate goes ahead even when the irradiation is stopped. Moreover, to extend the pot life of such an adhesive composition, a component commonly called "cure retarder" is generally incorporated in the cationically photoreactive adhesive.

The Japanese patent application JPH10330717 discloses a photoreactive adhesive composition comprising bisphenol A type epoxy resin, polytetramethylene glycol and a cationic polymerization initiator. "Bisphenols" indicates a group of chemical compounds with two hydrophenyl functionalities and most of them are based on diphenylmethane. Bisphenol A (systematic name 2,2-bis(4-hydroxyphenyl)propane) is the most popular representative of this group. JPH10330717 further discloses bisphenol F (systematic name 4,4'-dihydroxydiphenylmethane) type epoxy resin as a suitable alternative to bisphenol A type epoxy resin, suggesting a replacement between them as excluding alternatives (i.e. using only bisphenol A type or only bisphenol F type as epoxy component) or as equivalent alternatives (i.e. using a different ratio between bisphenol A and bisphenol F to obtain a prefixed amount of the epoxy component without any effect to the properties of the adhesive composition or the consequent cured material). The International patent application WO02055625 discloses a photoreactive hot-melt adhesive composition comprising a bisphenol F epoxy resin, a cationic photoinitiator and a compound preferably selected between a copolymer of tetramethylene oxide and ethylene oxide or a copolymer of tetramethylene oxide and propylene oxide. Moreover, WO02055625 describes the possibility that bisphenol F is mixed to bisphenol A in the epoxy component of the adhesive if their respective weight ratio is at least 12.5, teaching that the replacement of bisphenol F with bisphenol A exhibits some drawbacks such as, for example, an insufficient resistance against hydrophilic liquids. Moreover, a strong increase in glass transition temperature and viscosity characterizes the compositions disclosed in WO02055625.

The U.S. Pat. Nos. 5,596,024 and 5,854,325 disclose photo-polymerisable epoxy adhesive compositions wherein epoxy acrylate components are used in association to an epoxy resin in order to achieve an excellent preservative stability, without giving rise to failure under hot and humid conditions, but it is silent on how said compositions should be modified to provide high adhesive strength immediately after their application and have excellent flexibility and durability after curing. In particular U.S. Pat. No. 5,854,325 discloses compositions mainly based on the use of bisphenol A or, as an alternative, bisphenol F epoxy resins.

The U.S. Pat. No. 9,845,416 discloses a thermally or photoreactive curable adhesive composition containing a mixture of bisphenol F epoxy resin, as main component, combined with an amount of bisphenol A epoxy resin that is less than half of the bisphenol F epoxy resin content.

All the above referred prior-art publications are silent about how adhesive compositions, after curing, can achieve oxygen transmission rate suitable to be used for sealing of flexible substrates, for example, in the field of electronic devices, smart glasses (electrochromic and dynamic glasses), advanced packaging or other applications where it is strongly needed to control (i.e. limit) the oxygen permeation in order to preserve the application requirements for sensitive devices or materials.

DESCRIPTION OF THE INVENTION

Therefore, an object of the present invention is to provide curable adhesive compositions which are readily applicable to an adherend, complete curing in a very short time, achieve high adhesive strength immediately after lamination without requiring a long period of aging, exhibit excellent flexibility after curing and also have an improved oxygen barrier performance.

In accordance with an aspect of the present invention, a curable composition is provided comprising a bisphenol F epoxy resin and ethylene-vinyl alcohol (EVOH) copolymer, preferably in the form of capsules or beads dispersed therein, more preferably in a specific weight ratio with respect to the resin amount. In particular, the inventors of the present invention have found that the use of a dispersion of EVOH in an adhesive composition results in an effective improvement of the oxygen transmission rate (OTR) thereof particularly when EVOH is used in association to a specific chemical composition of the resin used as base component and in a specific concentration range related to the resin amount.

In the context of the present invention, the terms "capsules" and "beads" are used as synonyms to describe both particles composed of a solid shell surrounding an internal empty core and particles with controlled size and internal core made of the same shell material. Ethylene-vinyl alcohol is a copolymer of ethylene and vinyl alcohol, usually prepared by polymerization of ethylene and vinyl acetate and subsequent hydrolysis of the obtained ethylene-vinyl acetate (EVA). EVOH copolymer is often defined by its ethylene content measured as mole % and, as a consequence, both high-ethylene EVOH (i.e. EVOH with a high mole % ethylene content, such as is in the range between 24 to 40%) and low-ethylene EVOH (i.e. EVOH with a low mole % ethylene content, such as lower than 24% mol.) are commercially available. According to the present invention, high-ethylene EVOH is preferred. In order to improve the EVOH barrier properties, through the stabilization of its crystalline form, suitable capsule preparation methods have been used, such as, for example, spray drying, emulsification, nano-precipitation and supercritical fluid technologies. In particular, spray drying processing has been used to produce high-ethylene EVOH capsules. The obtained capsules, which retain their crystallinity in a wet environment (i.e. Relative Humidity higher than 60%), are characterized by a particle size distribution with a Volume Mean Diameter comprised between 0.1 and 10.0 µm. Said Volume Mean Diameter (VMD) can be defined as the volume-weighted mean particle size of the sample measured by dry dispersion laser diffraction and calculated by using Fraunhofer theory. These capsules can be dispersed in the adhesive composition according to the present invention. In this regard, the inventors have found that the oxygen barrier properties of the thermally cured composition can be improved particularly when the weight ratio between bisphenol F epoxy resin and the dispersed EVOH capsule amount is comprised between 1 and 10, preferably between 1 and 7.

The type of the bisphenol F epoxy resin is not binding and does not particularly affect the effectiveness of the present curable adhesive composition. For example, bisphenol F epoxy resins having average molecular weights in the approximate range of 300-10,000 gr/mol can be all suitably used. Specific examples thereof include those sold under the names of EPICOAT 4004P and EPICOAT 4010P manufactured by Yuka-Shell Epoxy Co., Ltd. Another type of suitable bisphenol F can be a liquid epoxy resin having number average molecular weights (i.e. the average molecular weight of all the polymer chains in the sample) lower than 700 gr/mol such as, for example, that sold by Hexion under the name EPON™ Resin 862.

As effect of the use of the bisphenol F epoxy resin as main reactive component, the curable adhesive composition of the present invention can provide a cured product with improved physical properties such as, for example, toughness, durable adhesion and flexibility. In addition, according to any of the embodiments herein disclosed, the composition of the present invention can further comprise a second bisphenol epoxy resin other than bisphenol F epoxy resin, such as for example bisphenol A. Preferably, the weight ratio between bisphenol F and the second bisphenol epoxy resin is comprised between 2 and 10, more preferably between 3 and 8. In particular, the above mentioned advantageous properties can be obtained when bisphenol F epoxy resin is used in association with bisphenol A epoxy resin together with at least one rubber-modified epoxy resin and at least one epoxy acrylate component.

Therefore, the present invention also refers to a composition, in particular a thermally curable composition, comprising a bisphenol F epoxy resin, at least one rubber-modified epoxy resin and at least one epoxy acrylate component, characterized in that ethylene-vinyl alcohol copolymer capsules are dispersed in said composition and wherein preferably the weight ratio between the bisphenol F epoxy resin and the capsules is in the range between 1 and 10. Optionally, said composition further comprises a second bisphenol epoxy resin other than bisphenol F epoxy resin, preferably wherein the weight ratio of bisphenol F epoxy resin with respect to the second bisphenol epoxy resin is comprised between 2 and 10.

In a preferred embodiment of the present invention, the curable adhesive composition comprises a mixture of a bisphenol F epoxy resin and a bisphenol A epoxy resin wherein the weight ratio between said epoxy resins is higher than 2, preferably between 2 and 10, more preferably between 3 and 8. The bisphenol A epoxy resin is particularly useful for its ability to impart improved resistance against hydrophilic liquids to a bonded laminate. The type of bisphenol A epoxy resin is not particularly binding. For example, unmodified bisphenol A epoxy resins having average molecular weights lower than 1000 gr/mol can be suitably used. Specific examples thereof include those sold under the names of EPON™ 828 manufactured by Hexion, D.E.R.™ 332 manufactured by DOW Chemical, Araldite® GY 6010 manufactured by Huntsman As anticipated above, the curable adhesive composition of the present invention can further comprise a rubber-modified epoxy resin component, preferably in the amount of 1 to 10 parts by weight, based on 100 parts by weight of the whole curable adhesive composition.

Rubber-modified bisphenols are epoxy resins where rubber chains are covalently linked to the bisphenol unit. These components are generally obtained through the reaction of reactive groups at the chain ends of a rubber copolymer, i.e. a copolymer that displays rubber-like elasticity, and epoxy groups. Typically adopted reactive groups are, for example, carboxylic acid or amine groups while usually adopted rubbers are, for example, copolymers of butadiene and acrylonitrile. Rubber-modified epoxy resins deriving from the family of copolymers of butadiene and acrylonitrile such as, for example, a poly (acrylonitrile-co-butadiene) modified bisphenol resin, are particularly preferred for the formulation of compositions according to the present invention.

Carboxyl-terminated butadiene-acrylonitrile resins can be also used. In particular, the rubber-modified epoxy resin component may be selected from EPIKOTE™ 03161 manufactured by Hexion, KR-208 and KR-309 manufactured by Kukdo Chemical (Kunshan) co. LTD., EPR 2000 manufactured by Adeka Corporation. The inventors have found that the composition according to the present invention can preferably have a weight ratio between the dispersed EVOH capsules and the rubber-modified epoxy resin comprised in the range 0.5 to 5.

Moreover, the curable adhesive composition can further comprise an epoxy acrylate component, preferably in the amount of 1 to 5 parts by weight, based on 100 parts by weight of the whole curable adhesive composition. Notably, the bisphenol F epoxy resin increases the resistance of the cured product to water and other hydrophilic liquids, especially when reacted with an epoxy acrylate component. This epoxy acrylate component is a reactive monomer where acrylic functionalities are combined to glycidyl functional groups or bisphenol units. For example, it may be selected from the group consisting of, but not limited to: glycidyl acrylate, glycidyl methacrylate, bisphenol A diacrylate, bisphenol F diacrylate or mixtures thereof. Preferably, it may be selected between glycidyl acrylate and glycidyl methacrylate. Epoxy acrylates components are optionally used in combination with multifunctional monomers such as, for example, trimethylolpropane trimethacrylate, and trimethylolpropane triacrylate to increase the curing rate. According to a preferred embodiment, in the composition of the present invention a blend of glycidyl acrylate and trimethylolpropane triacrylate can be used.

Preferably, the weight ratio of said at least one epoxy acrylate component with respect to said at least one rubber-modified epoxy resin is comprised between 0.1 and 1. Although its molecular weight is not particularly binding, a thermoplastic filler can be advantageously added to the composition according to the present invention. For instance, it can be selected from the group consisting of, but not limited to: poly(methyl methacrylate-co-ethylene glycol dimethacrylate), poly(methyl methacrylate-co-ethyl acrylate), poly(styrene-co-divinylbenzene), and polymethylsilsesquioxane, and it preferably has a weight average molecular weight of 1,000 gr/mol or higher, for its ability to improve heat-resistant adhesion. Preferably, the particle size of the thermoplastic filler is smaller than 20 μm and the amount of the thermoplastic filler incorporated is within the range of 1-8 parts by weight, based on 100 parts by weight corresponding to the total weight of the composition according to the present invention. If compared to bisphenol F-based compositions in the state of the art, this concentration of thermoplastic filler can be lowered up to be significantly less than 10% by weight of the composition and this can be useful to minimize its jeopardizing impact on the barrier properties.

In the present invention, the thermally adhesive composition can further comprise a curing agent that can be suitably used as thermal initiator, so long as it is activated by exposure to heat to cause ring-opening polymerization of the epoxy resin. Said thermal initiator can be, for example, an amine curing agent or an anhydride curing agent. Preferred examples of amine curing agents are ethylenediamine, trimethylhexamethylendiamine, diethylenetriamine, 2-hydroxyethyldiethylenetriamine, dipropylenetriamine, triethylenetetramine, tetraethylenepentamine, diproprenediamine, diethylaminopropylamine, dimethylaminopropylamine, m-xylylenediamine, N-aminoethylpiperazine, methane diamine, isophoronediamine, cyclohexylpropylenediamine or mixtures thereof.

Preferred examples of anhydride curing agents are methyltetrahydrophtalic anhydride, methyl endomethylenetetrahydrophthalic anhydride, methylhexahydrophthalic anhydride, dodecenylsuccinic anhydride or mixtures thereof. Curing agents react with glycidyl resins slowly at room temperature, but higher temperatures induce a faster curing mechanism. Moreover, curing agents can be also used as latent hardeners in formulating single-component thermally curable epoxy resins. Preferred examples of latent hardeners are dicyandiamide and organic-acid hydrazide. In particular, dicyandiamide is normally used in the form of fine powder or modified particles dispersed in the resin ensuring a very long pot life.

The loading of the curing agent is optimal when the number of active hydrogen is equal to that of moles in epoxy groups. Generally for 25 parts of an epoxy resin with equivalent number of 200 g/eq, 25-50 parts by weight have to be adopted for a curing agent with 200-100 number of active hydrogen, based on 100 parts by weight of the overall composition weight, allowing a complete polymerization of the adhesive composition with thermal treatment at a temperature in the range between 70-120° C. for a time between 60 and 20 minutes.

A good composition dispensability and usefulness in manufacturing processes are strictly connected to its rheological features. Specifically, considering our application, good dispensability properties are achieved with viscosity values higher than 20,000 mPa (measured at 5 s$^{-1}$ shear rate) and higher than 10,000 mPa (measured at 50 s$^{-1}$ shear rate).

In some possible alternative embodiments of the present invention the curable composition can further contain one or more commonly used solvents selected among acetone, methyl acetone, methyl ethyl ketone, methyl isobutyl ketone, cyclohexanone, diethyl ketone, diisobutyl ketone, and propylene carbonate in an amount comprised between 10% wt and 50% wt with respect to the weight of the final liquid composition. Said solvents can be then evaporated during the thermal treatment suitable to induce the curing process of the composition and also defined accordingly to the solvent vapor tension.

The adhesive composition in accordance with the present invention may further comprise other additional components, if necessary, within a range that does not impede the purposes of the present invention. Examples of such components include adhesion improvers, sensitizers, dehydrating agents, antioxidants, stabilizers, plasticizers, waxes, fillers, spacers, flame retardants, blowing agents, antistatic agents, fungicides, viscosity control agents and the like. Additional components are not limited to those listed above, and any combination or mixture of the above-listed components may be added. The type of adherend to which the adhesive composition in accordance with the present invention is applied is not particularly limited. The adhesive composition in accordance with any one of the embodiments of the present invention can also be applied to adherends made from a wide range of materials including, just to mention a few, plastics such as polycarbonate, polypropylene such as biaxially oriented polypropylene, polyimide, polyallylate, polyetherimide other than polyethylene terephthalate and polyethylene naphthalate, rubbers such as ethylene propylene rubber; bioplastics such as polylactic acid; metals such as iron and aluminum and alloys; glasses; cellulosic materials such as wood and paper; leathers and the like. The adhesive composition according to the present invention can be used as perimetric sealant between the above adherends or as a layer in a multilayer structure comprising them.

The present invention will be further explained by the following non-limiting examples.

Example S1

51.9 parts by weight of a liquid bisphenol F epoxy resin, 6.7 parts by weight of a liquid bisphenol A epoxy resin, 10.3 parts by weight of poly (acrylonitrile-co-butadiene) modified bisphenol resin, 4.1 parts by weight of a blend of glycidyl acrylate and trimethylolpropane triacrylate, 4.1 parts by weight of poly(methyl methacrylate-co-ethylene glycol dimethacrylate), 12.3 parts by weight of dicyandiamide, 10.6 parts by weight of EVOH capsules are mixed together in a kneading machine to obtain a thermally reactive adhesive composition.

The obtained liquid material has been cured by applying a heating process at 100° C. for 1 hour.

Example S2

39.8 parts by weight of a liquid bisphenol F epoxy resin, 5.1 parts by weight of a liquid bisphenol A epoxy resin, 7.9 parts by weight of poly (acrylonitrile-co-butadiene) modified bisphenol resin, 3.2 parts by weight of a blend of glycidyl acrylate and trimethylolpropane triacrylate, 3.1 parts by weight of poly(methyl methacrylate-co-ethylene glycol dimethacrylate), 9.5 parts by weight of dicyandiamide, 31.4 parts by weight of EVOH capsules are mixed together in a kneading machine to obtain a thermally reactive adhesive composition.

The obtained liquid material has been cured by applying a heating process at 100° C. for 1 hour.

Example S3

41.7 parts by weight of a liquid bisphenol F epoxy resin, 5.4 parts by weight of a liquid bisphenol A epoxy resin, 8.3 parts by weight of poly (acrylonitrile-co-butadiene) modified bisphenol resin, 3.3 parts by weight of a blend of glycidyl acrylate and trimethylolpropane triacrylate, 9.9 parts by weight of dicyandiamide, 31.4 parts by weight of EVOH capsules are mixed together in a kneading machine to obtain a thermally reactive adhesive composition.

The obtained liquid material has been cured by applying a heating process at 100° C. for 1 hour.

Example S4

53.1 parts by weight of a liquid bisphenol F epoxy resin, 6.9 parts by weight of a liquid bisphenol A epoxy resin, 10.5 parts by weight of poly (acrylonitrile-co-butadiene) modified bisphenol resin, 4.2 parts by weight of a blend of glycidyl acrylate and trimethylolpropane triacrylate, 4.1 parts by weight of poly(methyl methacrylate-co-ethylene glycol dimethacrylate), 12.6 parts by weight of dicyandiamide, 8.5 parts by weight of EVOH capsules are mixed together in a kneading machine to obtain a thermally reactive adhesive composition.

The obtained liquid material has been cured by applying a heating process at 100° C. for 1 hour.

Example C1 (Comparative: Lacking EVOH Capsules)

58 parts by weight of a liquid bisphenol F epoxy resin, 7.5 parts by weight of a liquid bisphenol A epoxy resin, 11.5 parts by weight of poly (acrylonitrile-co-butadiene) modified bisphenol resin, 4.6 parts by weight of a blend of glycidyl acrylate and trimethylolpropane triacrylate, 4.6 parts by weight of poly(methyl methacrylate-co-ethylene glycol dimethacrylate), 13.8 parts by weight of dicyandiamide are mixed together in a kneading machine to obtain a thermally reactive adhesive composition. The obtained liquid material has been cured by applying a heating process at 100° C. for 1 hour.

Example C2 (Comparative: With EVOH in the Form of Common Powder Instead of Capsules)

51.9 parts by weight of a liquid bisphenol F epoxy resin, 6.7 parts by weight of a liquid bisphenol A epoxy resin, 10.3 parts by weight of poly (acrylonitrile-co-butadiene) modified bisphenol resin, 4.1 parts by weight of a blend of glycidyl acrylate and trimethylolpropane triacrylate, 4.1 parts by weight of poly(methyl methacrylate-co-ethylene glycol dimethacrylate), 12.3 parts by weight of dicyandiamide, 8.3 parts by weight of EVOH powder are mixed together in a kneading machine to obtain a thermally reactive adhesive composition.

The obtained liquid material has been cured by applying a heating process at 100° C. for 1 hour.

Example C3 (Comparative: Ratio Out of Range)

57.9 parts by weight of a liquid bisphenol F epoxy resin, 7.5 parts by weight of a liquid bisphenol A epoxy resin, 11.5 parts by weight of poly (acrylonitrile-co-butadiene) modified bisphenol resin, 4.6 parts by weight of a blend of glycidyl acrylate and trimethylolpropane triacrylate, 13.8 parts by weight of dicyandiamide, 4.8 parts by weight of EVOH capsules are mixed together in a kneading machine to obtain a thermally reactive adhesive composition.

The obtained liquid material has been cured by applying a heating process at 100° C. for 1 hour.

Example C4 (Comparative: Photoreactive Instead of Thermally Reactive Mixture)

43.8 parts by weight of a liquid bisphenol F epoxy resin, 5.6 parts by weight of a liquid bisphenol A epoxy resin, 8.7 parts by weight of poly (acrylonitrile-co-butadiene) modified bisphenol resin, 3.5 parts by weight of a blend of glycidyl acrylate and trimethylolpropane triacrylate, 3.5 parts by weight of poly(methyl methacrylate-co-ethylene glycol dimethacrylate), 3.5 parts by weight of triphenylsulfonium salts, 31.5 parts by weight of EVOH capsules are mixed together in a kneading machine to obtain a photoreactive adhesive composition.

The obtained liquid material has been cured by applying an irradiance of 100 mW/cm$^2$ for 120 s with $\lambda=365$ nm.

Example C5 (Comparative: As-is Commercially Available Epoxy Formulation)

A commercially available thermally reactive epoxy resin (EPO-TEK® OD1001) has been cured by applying a heating process at 150° C. for 1 hour.

Example C6 (Comparative: Commercially Available Epoxy Formulation with Addition of EVOH Capsules)

90 parts by weight of the commercially available thermally reactive epoxy resin of example C5 and 10 parts by weight of EVOH capsules are mixed together in a kneading machine. The obtained liquid material has been cured by applying a heating process at 150° C. for 1 hour.

| Example | Bisphenol F (wt %) | Bisphenol A (wt %) | Epoxy rubber (wt %) | Epoxy Acrylic (wt %) | EVOH capsules (wt %) | Bisphenol F/ EVOH capsules | Curing initiator |
|---|---|---|---|---|---|---|---|
| S1 | 51.9 | 6.7 | 10.3 | 4.1 | 10.6 | 4.90 | Thermal |
| S2 | 39.8 | 5.1 | 7.9 | 3.2 | 31.4 | 1.27 | Thermal |
| S3 | 41.7 | 5.4 | 8.3 | 3.3 | 31.4 | 1.33 | Thermal |
| S4 | 53.1 | 6.9 | 10.5 | 4.2 | 8.5 | 6.25 | Thermal |
| C1 | 58.0 | 7.5 | 11.5 | 4.6 | 0.0 | n.a. | Thermal |
| C2 | 51.9 | 6.7 | 10.3 | 4.1 | 10.6[†] | n.a. | Thermal |
| C3 | 57.9 | 7.5 | 11.5 | 4.6 | 4.8 | 12.06 | Thermal |
| C4 | 43.8 | 5.6 | 8.7 | 3.5 | 31.5 | 1.39 | UV |
| C5 | commercial epoxy formulation | | | | 0.0 | n.a. | Thermal |
| C6 | commercial epoxy formulation | | | | 10.0 | n.a. | Thermal |

[†]EVOH in the form of powder instead of capsules

Example 11 (Comparison Between the
Compositions of the Ten Examples S1-S4 and
C1-C6)

A thin film of each adhesive composition has been obtained with an Elcometer 4340 Automatic Film Applicator set to a nominal thickness of 100 μm and cured accordingly to the recipe detailed in each example.

Oxygen Transmission Rate (OTR) has been measured with a Mocon OX-TRAN Model 2/22 L at 23° C. and 0% R.H. on two different portions of the same film.

In order to assess dispensability of the obtained liquid formulations, the viscosity of each adhesive composition has been measured with a Haake RheoStress 6000 at a shear rate of 5 s$^{-1}$ and 50 s$^{-1}$.

| Example | OTR (cc m$^{-2}$ day$^{-1}$) | viscosity (mPa) | |
| --- | --- | --- | --- |
| | | 5 s$^{-1}$ | 50 s$^{-1}$ |
| S1 | 13.1 | 77,800 | 18,400 |
| S2 | 10.2 | 235,000 | 74,700 |
| S3 | 11.8 | 930,000 | 74,500 |
| S4 | 11.4 | 22,900 | 13,100 |
| C1 | 18.9 | 13,000 | 11,800 |
| C2 | 42.9 | n.a.† | |
| C3 | 15.0 | 19,250 | 9,900 |
| C4 | 18.0 | 200,000 | 35,800 |
| C5 | 44.5 | 2,400 | 1,200 |
| C6 | 211 | 18,000 | 2,400 |

†EVOH powder granulometry prevented a reliable viscosity assessment

The invention claimed is:

1. A curable composition comprising a bisphenol F epoxy resin, at least one rubber-modified epoxy resin, and at least one epoxy acrylate component, wherein ethylene-vinyl alcohol copolymer capsules are dispersed in said composition and a weight ratio between the bisphenol F epoxy resin and said capsules is comprised between 1 and 10.

2. The curable composition according to claim 1, wherein said composition further comprises a second bisphenol epoxy resin other than bisphenol F epoxy resin.

3. The curable composition according to claim 2, wherein a weight ratio of the bisphenol F epoxy resin with respect to the second bisphenol epoxy resin is comprised between 2 and 10.

4. The curable composition according to claim 1, wherein said bisphenol F epoxy resin is a liquid epoxy resin having number average molecular weights lower than 700 gr/mol.

5. The curable composition according to claim 1, wherein a weight ratio of said ethylene-vinyl alcohol copolymer capsules and said at least one rubber-modified epoxy resin is comprised between 0.5 and 5.

6. The curable composition according to claim 1, wherein a weight ratio of said at least one epoxy acrylate component with respect to said at least one rubber-modified epoxy resin is comprised between 0.1 and 1.

7. The curable composition according to claim 1, wherein said rubber-modified epoxy resin is present in amount of 1 to 10 parts by weight, based on 100 parts by weight of the whole curable composition.

8. The curable composition according to claim 1, wherein said rubber-modified epoxy resin comprises at least one selected from the group consisting of butadiene and acrylonitrile.

9. The curable composition according to claim 1, wherein said epoxy acrylate component is present in amount of 1 to 5 parts by weight, based on 100 parts by weight of the whole curable composition.

10. The curable composition according to claim 1, wherein said at least one epoxy acrylate component is selected from glycidyl acrylate, glycidyl methacrylate, bisphenol A diacrylate, bisphenol F diacrylate, optionally in combination with trimethylolpropane trimethacrylate or trimethylolpropane triacrylate.

11. The curable composition according to claim 1, wherein said composition further comprises at least one thermoplastic filler.

12. The curable composition according to claim 11, wherein said at least one thermoplastic filler is selected from poly(methyl methacrylate-co-ethylene glycol dimethacrylate), poly(methyl methacrylate-co-ethyl acrylate), poly(styrene-co-divinylbenzene), and polymethylsilsesquioxane.

13. The curable composition according to claim 1, wherein said composition further comprises at least one thermal initiator.

14. The curable composition according to claim 13 wherein said thermal initiator is selected from the group consisting of ethylenediamine, trimethylhexamethylendiamine, diethylenetriamine, 2-hydroxyethyldiethylenetriamine, dipropylenetriamine, triethylenetetramine, tetraethylenepentamine, diproprenediamine, diethylaminopropylamine, dimethylaminopropylamine, m-xylylenediamine, N-aminoethylpiperazine, methane diamine, isophoronediamine, cyclohexylpropylenediamine methyltetrahydrophtalic anhydride, methyl endomethylenetetrahydrophthalic anhydride, methylhexahydrophthalic anhydride, and dodecenylsuccinic anhydride.

15. The curable composition according to claim 1, wherein said composition further comprises at least one latent hardener selected from the group consisting of dicyandiamide and organic-acid hydrazide.

* * * * *